Aug. 13, 1929. E. J. SWEETLAND 1,724,436
THICKENER
Filed Jan. 24, 1924    4 Sheets-Sheet 2
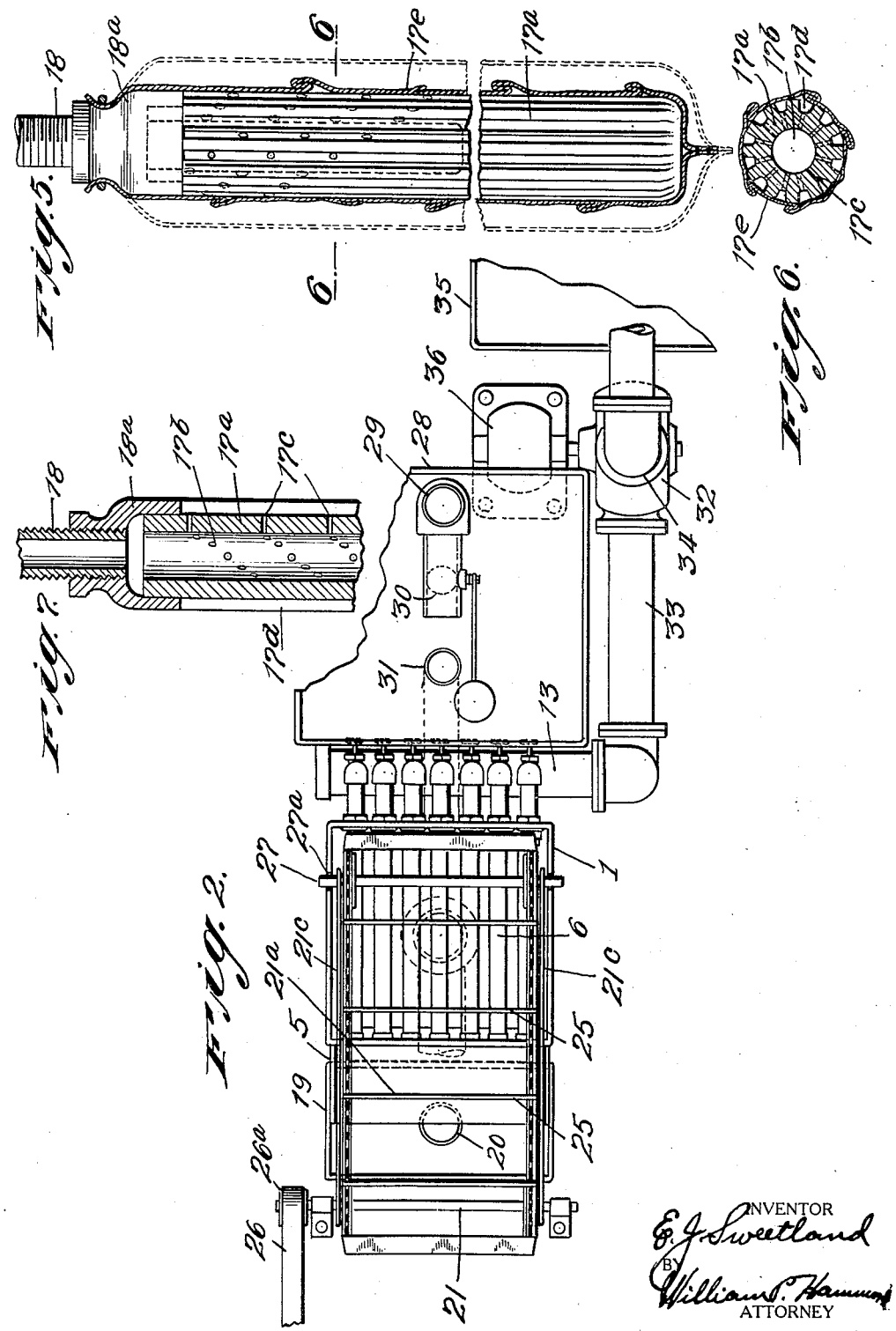

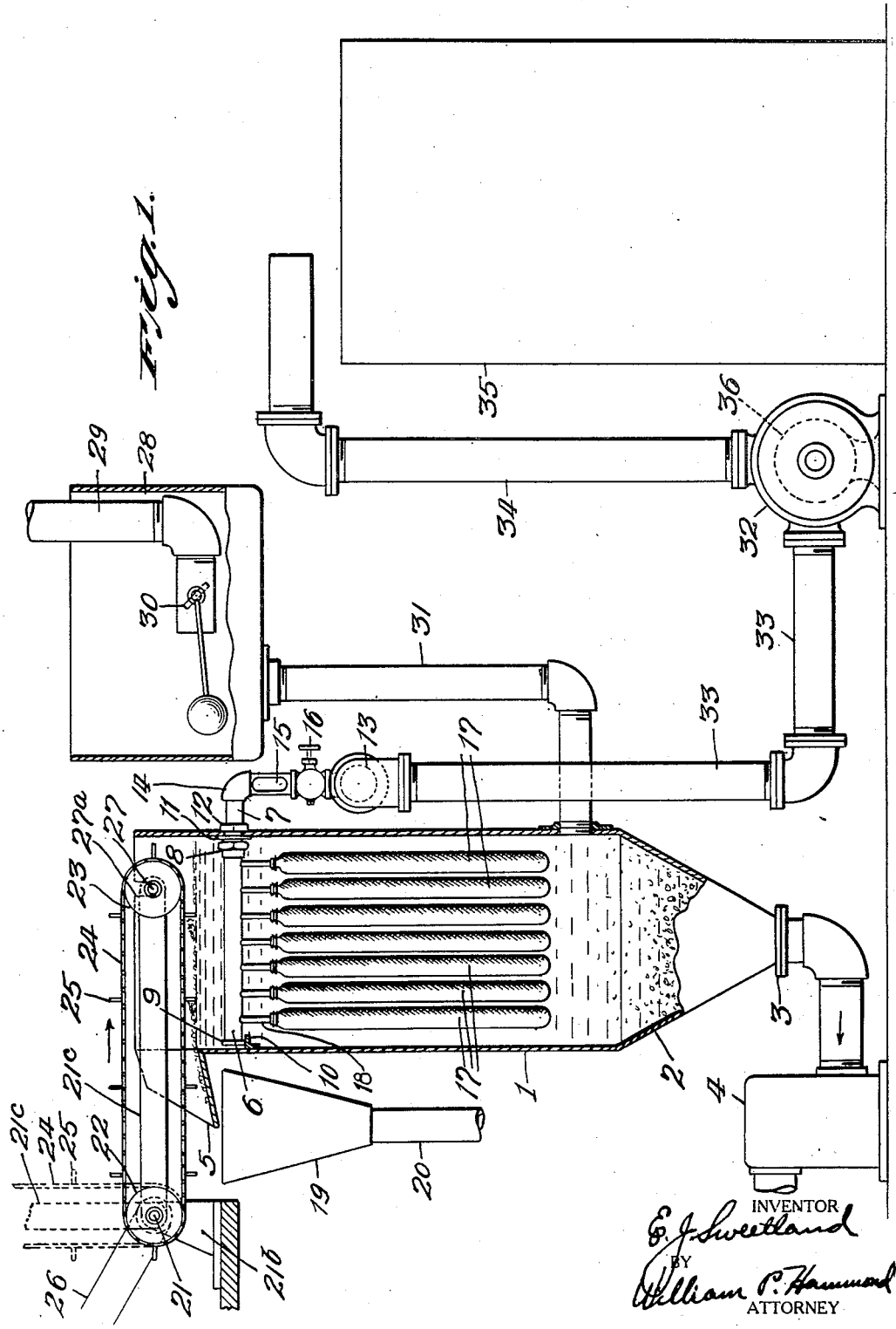

Aug. 13, 1929.  E. J. SWEETLAND  1,724,436
THICKENER
Filed Jan. 24, 1924  4 Sheets-Sheet 3
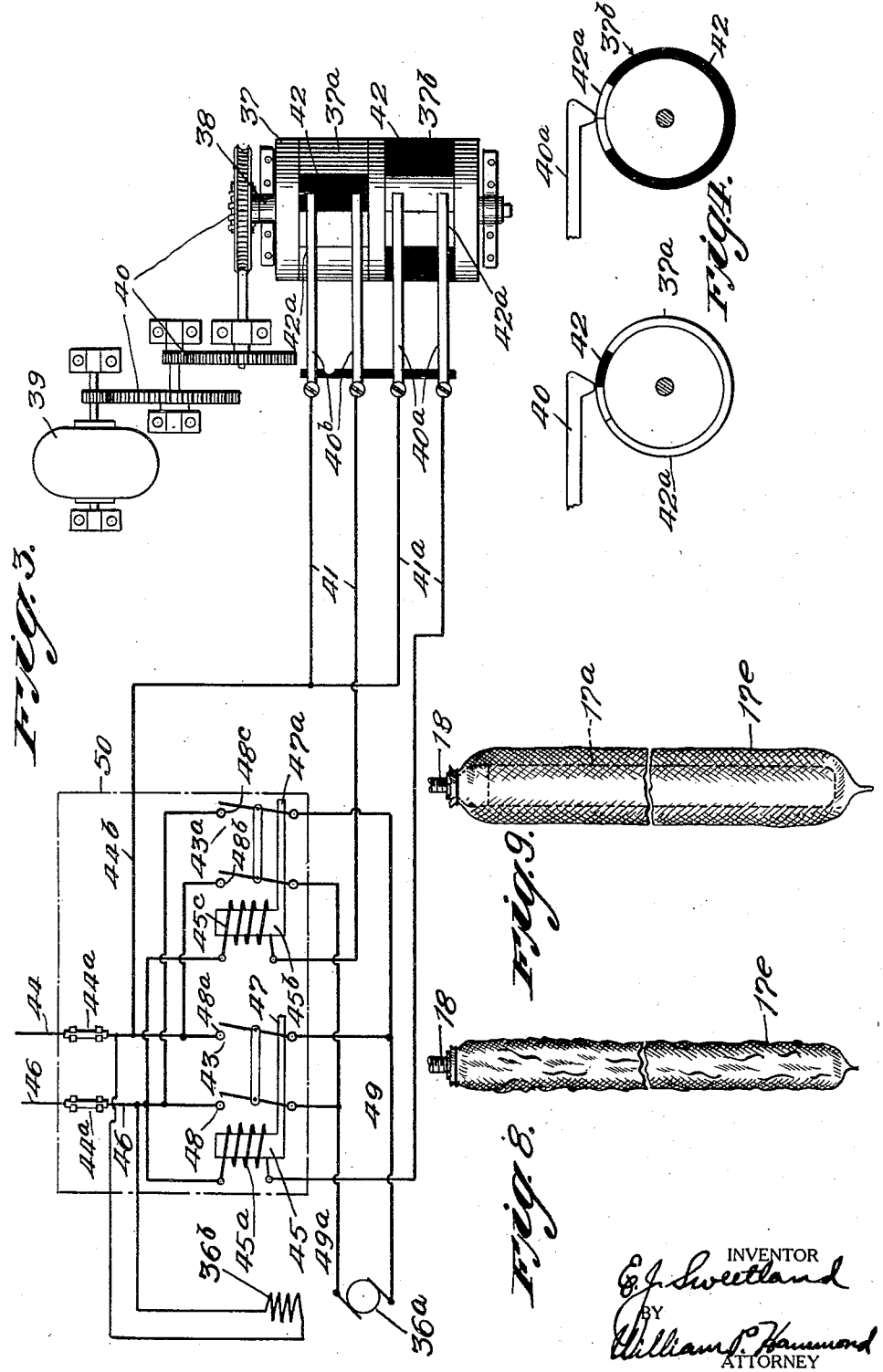
INVENTOR
E. J. Sweetland
BY
William P. Hammond
ATTORNEY Patented Aug. 13, 1929.

1,724,436

UNITED STATES PATENT OFFICE.

ERNEST J. SWEETLAND, OF HAZLETON, PENNSYLVANIA, ASSIGNOR TO OLIVER UNITED FILTERS, INC., OF SAN FRANCISCO, CALIFORNIA, A CORPORATION OF NEVADA.

THICKENER.

Application filed January 24, 1924. Serial No. 688,254.

This invention relates to an apparatus for concentrating or thickening the solid constituent of liquids containing small percentages of solid matter, in order to prepare the concentrated liquid for economical filtration in other filtering apparatus or for other purposes.

It is one of the objects of the invention to provide a filter or thickener which is automatic and self-cleaning and is continuous in its operation.

Another object of the invention is to provide a thickener or concentrator which will operate automatically on a predetermined cycle, in which filtering and cleaning periods of unequal duration alternate and in which a period of inaction of the filtering pressure between the cleaning and filtering periods permits the collected cake to be completely removed from the filtering zone.

Another object of the invention is to provide an automatic control mechanism which will operate the thickener according to the desired cycle of operation and which may be adjusted to vary the sequence, periods or speed of the cycle in accordance with the nature of the liquid which is being concentrated.

Many other objects and advantages relating to the operation and mechanical construction of my thickener will appear as the description of the invention proceeds.

A particularly important feature of the invention and one which is not limited to use in a thickener or in liquid filtration is the use of an oversized filter bag which is adapted to be contracted and cling to the core of the filtering element during the filtering period and to be expanded to dislodge the filter cake therefrom during the cleaning period.

A further and important feature of the invention resides in the provision of a filtrate off-take disposed below the normal level of liquid in the tank or chamber in which are located the filter elements. This position of the off-take permits the filtrate to be removed from the tank against a minimum head of liquid. The importance of this feature will be realized when the problem of filtering hot liquids by suction, is considered. As will be apparent, a slight diminution only of the pressure above the surface of the liquid is needed for the liquid to boil when the temperature of the liquid approximates its boiling point under the prevailing atmospheric conditions, and where, as is usual in the art, a hot liquid leaving the filter chamber must be raised a substantiial distance above the liquid level, the capacity of the pump delivering filtrate therefrom will, due to greater suction required, be seriously reduced. In accordanace with the present invention, therefore, I preferably dispose the filtrate off-take at or below the normal level of the liquid in the filter chamber and pass the same thru a side wall of the chamber and thence to a source of suction, also disposed below the liquid level, whereby the filtrate is not elevated above said level during its travel to the source of suction and advantage is taken of the hydrostatic pressure of the liquid above the filtrate off-take to increase the efficiency of filtration.

A further object of the invention is to provide a filter system in which a wet vacuum pump may be used. This pump will in the usual case, be disposed in the filtrate off-take whereby both the liquid and vapor (or air) will be handled by the pump. By means of this construction the usual vacuum chamber, between the suction pump and the filter elements is dispensed with, thus greatly cheapening the cost of the apparatus and its upkeep.

Referring now to the drawings which illustrate a preferred form of embodiment of the invention Fig. 1 is a part sectional side elevation of one embodiment of the thickener.

Fig. 2 is a plan view of the apparatus.

Fig. 3 is a wiring diagram of the automatic control mechanism.

Fig. 4 is a diagrammatic view of the circuit control drums illustrating the operating cycle of the apparatus.

Fig. 5 is a detail view illustrating the construction and operation of the drainage member and filter bag.

Fig. 6 is a sectional view of Fig. 5 on the line 6—6.

Fig. 7 is a longitudinay cross-sectional view of the upper portion of one of the drainage members.

Figs. 8 and 9 are side elevations illustrating the position of the filter bag during the filtering and cleaning periods respectively.

Figure 10:
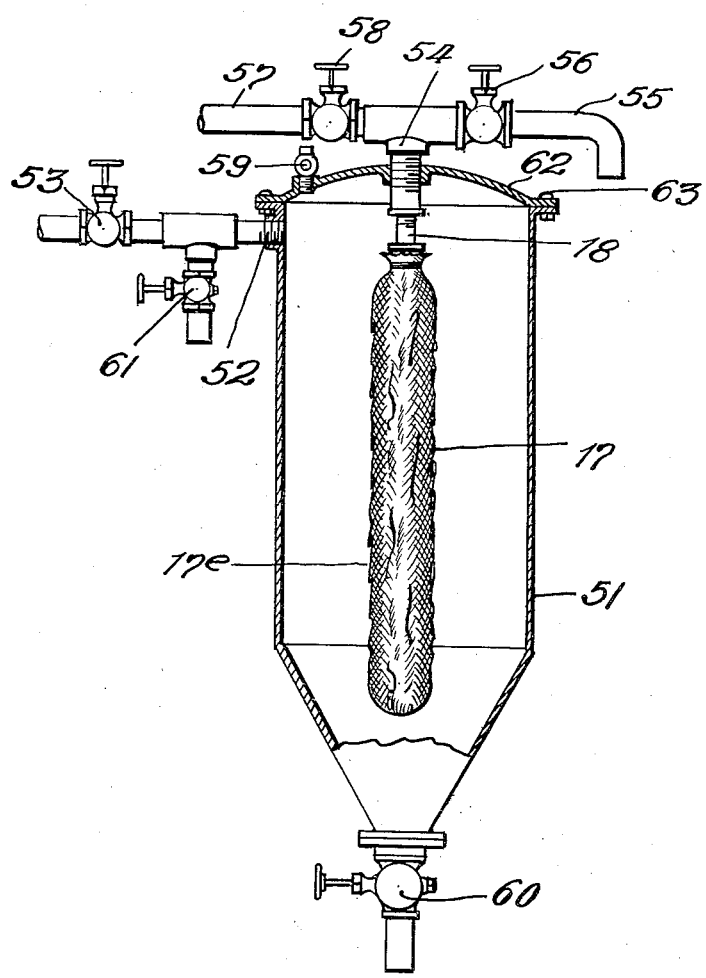
Fig. 10 is a diagrammatic view of one method of using the oversize filter bag for pressure filtration.

In the form of embodiment illustrated, the apparatus comprises a square or rectangular tank 1 provided with a cone-shaped bottom 2, terminating in the flanged pipe connections 3, which forms communication between the lowest part of the cone or inverted pyramid bottom and the pump 4. This pump may be of any type suitable for slowly pumping a thick sludge such for instance, as a diaphragm pump. On one side of the tank 1 and located near the top thereof is the overflow spout 5 which may be made of sufficient width to extend the full length of the tank 1 if necessary. Mounted within the tank is a plurality of headers 6, each of which is connected to a pipe nipple 7 by means of a union 8. The opposite end of each header is closed by a cap 9 and is supported by means of an angle iron 10 secured to the inner wall of tank 1. The nipples 7 which extend thru the wall of the tank are held in place by means of a flange 11 and lock nut 12. A main header 13 extends longitudinally of the tank, and each of the headers 6 communicate with the main header thru an elbow pipe 14. A slight glass 15 in the pipe 14 permits observation of the filtrate flowing thru the pipe 14, and a valve 16 between the main header 13 and the headers 6 permits the flow of filtrate from any of the headers to be cut off, for the purpose of repairing or replacing any of the filter elements 17 which are permitting any of the solid matter to pass therethru.

A plurality of the filter elements 17 are connected to each of the headers 6 by means of nipples 18, which are screwed into the headers. These filter elements are preferably tubular in form and comprise in their preferred embodiment a corrugated wooden drainage member $17^a$ which is hollow at the upper end, as at $17^b$, and is connected by means of a casting $18^a$ to the nipple 18. Holes $17^c$ extend from the hollow portion $17^b$ into each of the corrugations $17^d$ so as to permit the filtrate which is drawn upward by the suction to enter the nipple 18.

It is to be understood, of course, that any other desired form of drainage member, such as a perforated tube or pipe or a tubular frame covered with wire mesh or the like may be used in lieu of the corrugated wooden drainage member $17^a$.

Each of the drainage members $17^a$ is covered by a bag $17^e$ of a suitable filter fabric which is closed at the bottom, and is gathered at the top to element 17 by means of a cord, wire or the like. These bags are made of greater size than the drainage member $17^a$ for a purpose which will be described later.

A hopper or funnel 19 terminating at the bottom in the pipe 20 is designed to receive and conduct away any fluid or froth which may overflow thru the gutter or launder 5.

For the concentration of liquids which foam to such an extent as to cause inconvenience I supply a foam removing device $21^a$ as illustrated. This comprises a shaft 21, the ends of which rest in suitable fixed bearings $21^b$. Near each end of the shaft a sprocket wheel 22 is mounted and each sprocket wheel 22 is connected to the sprocket wheels 23 by means of the sprocket chains 24, which are provided with a plurality of flights 25 extending between the two chains. The sprockets are caused to rotate by means of a belt 26 and pulley $26^a$ connected to any suitable source of power whereby a slow motion is imparted to the shaft 21, chains 24 and the flights 25 in the direction indicated by the arrows to sweep the foam from the top of the liquid in the tank 1 into the spout 19.

As it is desirable to have the entire upper portion of the tank accessible at times for repair or replacement I have mounted the foam conveyor in a rectangular frame $21^c$ so that the shaft 21 remains in the bearings $21^b$ at all times, whereas the shaft 27 for the sprocket wheels 23 rests in open bearings $27^a$ in the walls of the tank 1 so that the entire conveying mechanism may be elevated to a vertical position illustrated in dotted lines in Fig. 1, where it is out of the way when not in use.

The material to be fed to the thickener or automatic filter as it may be called enters the feed tank 28 thru the pipe 29, which is provided near its outlet with a float valve 30. This float valve is so adjusted that the desired level of liquid to be filtered will be maintained in the tank 1. The solution to be concentrated entering the feed tank 28 passes thru the large pipe 31 into the main filter tank at approximately the point indicated, the liquid in feed tank 28 and the tank 1 will, of course, seek the same level.

The main header 13 is connected to a pump 32 which is of a high vacuum type and which will operate with equal facility in either direction by means of the pipe 33 and the pipe 34 discharges the filtered liquid into the fitrate tank 35. The pump 32 is preferably operated by a directly connected motor 36, and the motor is connected to a control mechanism in a manner to be described, so that the connections may be momentarily changed whenever it is desired to reverse the direction of the pump, a suitable reversing motor being provided for that purpose.

Figure 3 of the drawing is a diagrammatic lay-out of the wiring circuit and means for controlling the cycle of operation. A contact drum 37 consisting of the two sections $37^a$ and $37^b$ mounted on the same shaft 38 is constantly rotated by means of a small motor 39 thru suitable reducing gears 40. Various means for changing the speed of rotation of the shaft 38 and the contact drums carried thereby may be used, such as for example, a variable speed motor 39 or suitable change speed gearing.

The contact fingers $40^b$ and $40^a$ resting on the sections $37^a$ and $37^b$ respectively of the contact drum, control the forward and reverse circuits to the motor 36 thru the two sets of wires 41 and $41^a$ which are arranged so that when contact is made thru the fingers $40^a$ the motor and pump will be driven in a forward direction to deliver the filtrate which is sucked thru the bags $17^e$ into the filtrate tank 35 and when contact is made thru the fingers $40^b$, the direction of the motor 36 and pump 32 is reversed, and the filtrate remaining in the vertical pipe 34 is forced back into the filter elements, and this is followed by air which is sucked in thru the pump. The reversal of the pump of course, reverses the flow thru the filter bags and causes the cake which has been formed during the filtering period of the cycle to be dislodged and settle into the cone shaped bottom 2 of the tank. It is in this operation that the use of the oversize bags $17^e$ perform their most important function. During the filtering period the bags $17^e$ are drawn by the suction in the headers 6 and along the corrugations $17^d$ into close contact with the drainage member $17^a$ so that they become wrinkled and creased in the manner indicated in the full lines of Figs. 5 and 6 and in Fig. 8, and in this position the filtrate is sucked thru the bags and the cake deposited on the surface thereof. When the pump 32 is reversed, however, and pressure is applied to the interior of the bags not only does the back flow of the liquid and air thru the fabric of the bag tend to dislodge the cake, but the bags are suddenly expanded to approximately the shape illustrated in the dotted lines of Fig. 5 and in Fig. 9, the wrinkles are filled out and the cake is actually shaken, so to speak, from the surface of the bag, where it settles into the bottom of the tank 1 and is removed as a concentrated solution or sludge, thru the flange pipe 3. As the vertical pipe 34 discharges into the top of the tank 35, only the filtrate remaining in the pipe 34 is pumped back into the tank, so that the solution in the tank is not materially diluted by the cleaning operation.

Fig. 4 represents in a diagrammatic way the position of the sections $37^a$ and $37^b$ of the contact drum 37 at the same instant. In this figure the shaded portions 42 represent the contact sections and the lighter portion $42^a$ represent insulated sections. It is obvious, of course, that the relative proportion of contact and insulated sections may be varied according to the cycle of operation desired. In the position illustrated the contact fingers 40 are just passing off the reversing contact of the drum $37^a$ onto the insulated section and it is to be noted that the contacts $40^a$ for the forward movement of the motor 36 are also at this moment on an insulated section $42^a$ of the drum $37^b$ so that for a short period after the reversal of the pump no current will be conducted to the motor and the pump will remain idle a sufficient length of time to permit the filter cake which has just been shaken from the bags $17^a$ to settle into the bottom of the tank before suction is again started.

In the operation of the device the solution to be filtered enters the tank 28 thru the float valve 30 until it reaches the proper level in tank 1. It is assumed that the contact drum 37 is designed especially to suit the material to be concentrated, or is so constructed by well known means as to make the insulated portion and contact portion of the drum adjustable to suit various requirements. For the purpose of illustration, let us assume that the drum 37 makes one complete revolution every six minutes and that the contact pieces are so laid out that the reverse drum $37^a$ has 330° of its circumference covered with insulating material $42^a$ and 30° of its circumference covered with the contact material 42. The forward contact drum $37^b$ is designed with 300° of its surface covered with contact material 42 and 60° with insulation $42^a$. While the contact fingers $40^a$ are resting on the contact portion of the forward contact drum $37^b$ the pump 32 is rotating in the proper direction to create a suction in the filter element 17 and discharge the filtered liquid sucked thru them into the tank 35. When the drum 37 rotates to the point where the fingers $40^a$ run off of the contact material, immediately or within a few seconds thereafter, the contact fingers $40^b$ come in contact with the contact portion 42 of the reverse drum $37^a$ causing the motor to reverse its direction which pumps the liquid in the pipe 34 back thru the filter elements 17 and then continues to force air thru said elements to expand the filter bags and dislodge the cake therefrom until the fingers $40^a$ run off of the contact portion 42 on to the insulated portion of the drums $37^a$ and $37^b$ and consequently there is no motion to the pump 32. During this period the discharged cake has time to settle to the bottom of the tank so that when the fingers $40^a$ again reach the contact 42 of the drum $37^b$ the circuit is started in a forward direction the dislodged cake will not be redeposited. Meanwhile the pump 4 is continuously drawing from the bottom of the tank 1 the thickened product and delivering it to any desired point for disposal or further treatment. It is assumed that the pump 4 is driven by well known variable speed means so that the density of the thickened material may be varied by the rate of the pump.

The operation of the float valve 30 in the receiving tank 28 plays a very important part in controlling the level of the liquid in the tank 1 so as to prevent excessive overflow, when the normal level of the liquid in the tank is raised thru the inflation of the bags $17^e$, by the back flow of the filtrate and air during the cleaning period, and also in regulating the flow of the liquid in to the tank 1 in accordance with the rate of withdrawal, it being understood that the rate of filtration during the first portion of the filtering period is very rapid, and then gradually slows down until after the next cleaning period.

Although any desired means may be provided for reversing the current to the motor 36 without departing from the spirit of the invention, I have illustrated in a diagrammatic way, in the left-hand portion of Fig. 3 a means which may be used for that purpose. This illustration assumes the use of a D. C. motor 36 in which the current thru the armature $36^a$ is reversed to reverse the motor while the current thru the field $36^b$ is unchanged. This comprises generally a pair of magnetically controlled switches 43 and $43^a$ which are operated by the contacts on the drum sections $37^a$ and $37^b$ to reverse the flow of current thru the armature of the motor in order to operate it in opposite directions. During the filtering period the current coming in thru the lead 44 passes thru the fuse $44^a$ and branch $44^b$ to the upper finger $40^a$ across the contact portion 42 of the drum section $37^b$ and back thru the lower lead $41^a$ and coil $45^a$ of the solenoid 45 to the lead 46. The current thru the coil of the solenoid draws up the switch member 47 to close the contacts 48 and $48^a$ of switch 43, which permits the current from the lead 44 to pass thru the contact $48^a$ to the conductor 49 thru the armature $36^a$ to drive the motor in a forward direction, thru the conductor $49^a$ to the contact 48 and thence out thru the lead 46 to its source.

It is obvious under these circumstances that as soon as the fingers $40^a$ pass off the contact 42 of the drum section $37^b$ the coil of the solenoid 45 will be de-energized, the switch member 47 will drop down, and the contacts 48 and $48^a$ will be opened to break the flow of current to the motor 36. At substantially the same instant, however, contact is made by the drum section $37^a$ from the lead 44 thru the upper fingers $40^b$ and back along the lower wire 41 to the coil $45^c$ of the solenoid $45^b$ to the lead 46. The energization of the coil $45^c$ draws up the switch member $47^a$ and closes the contacts $48^b$ and $48^c$ which permits the current from the lead 44 to flow thru the contact $48^b$, in reverse direction along the conductor $49^a$ to the armature and back along the conductor 49 thru contact $48^c$ to the lead 46.

When both the fingers $40^b$ and $40^a$ are resting on the insulated portion of drum 37, there will, of course, be no current thru either solenoid and contacts 48, $48^a$, $48^b$, and $48^c$ will be open so that the motor will remain idle.

A suitable box or housing for the magnetic switches is indicated in dotted lines at 50.

While the use of a filter element including an oversize filter bag has been described with particular reference to the vacuum filter art it is to be understood that such filter elements may be used for the filtering of either gases or liquids by the use of pressure or vacuum and that the principle of using a filter bag which may be contracted upon a drainage member to deposit the cake thereon, and which may be expanded by flowing a fluid in reverse direction thru the bank, to dislodge the cake as disclosed in this application is not limited to the specific embodiment illustrated but is applicable broadly to the filtering art.

Fig. 10 illustrates one method in which this feature of the invention may be applied to self-cleaning pressure filters. In this figure, 51 indicates a suitable tank or the like adapted to contain one or more of the filter elements 17. 52 indicates a pipe thru which the fluid to be filtered, which may be either liquid or gaseous, is forced under pressure into the tank 51, a suitable valve 53 being provided to control the flow of the fluid into the tank. The nipple 18 of the filter element 17 is connected to a suitable outlet pipe or manifold 54 communicating with the discharge pipe 55 for the filtrate. A valve 56 permits the discharge of the filtrate to be stopped at will.

For reversing the flow thru the filter element 17, a pipe 57 is provided with a suitable valve 58, tapped into the outlet pipe 54. A pressure valve 59 provides an automatic means to relieve the pressure in the tank 51 if it exceeds a given maximum, and a discharge valve 60 permits the filter cake or concentrated liquid to be removed from the tank.

In the operation of this form of embodiment of the invention, the fluid to be filtered is flowed under pressure thru the pipe 52 into the tank 51 where it contracts the filter bag $17^e$ upon the drainage member and forces the filtrate thru the filter and out thru the pipe 55. When the cake which is deposited on the filter element 17 becomes thick enough to materially retard the rate of filtration, the filter element 17 may be cleaned, by closing the valves 53 and 56 and opening the overflow valve 61 to reduce the pressure in the tank, after which the cleaning fluid which may be steam, air, or a suitable liquid is admitted to the interior of the filter element thru the pipe 57, to expand the oversize bag 17e and dislodge the cake therefrom.

To permit access to the tank 51 for repairs or the like, a detachable cover 62 secured by means of bolts or the like 63 is provided therefor.

In compliance with the patent statutes, I have illustrated and described preferred forms of embodiment of my invention, however, it is to be understood that various changes may be made from the modifications described without departing from the spirit of the invention or the scope of the appended claims.

The term filter or filtering apparatus, as used in the accompanying claims is to be understood to cover generically the apparatus commercially known as filters or thickeners, and unless otherwise limited is to be considered as applying to either gaseous or liquid filters.

What I claim is:

1. A method of thickening a mixture of liquid and solids which consists in filtering the mixture until a cake of the solid material is formed on the filter element, passing a portion of the filtrate thru said element to dislodge the cake, and allowing a period of inaction of substantially the same duration as that of the cleaning period.

2. A cycle of operation for a filter of the type described which comprises a filtering period of substantially five-sixths of the cycle, a cleaning period of substantially one-twelfth of the cycle and a period of inaction of substantially one-twelfth of the cycle, said periods affecting all filter elements simultaneously.

3. In an apparatus of the type described, the combination with a filter element of a reversible pump, means to operate the pump in one direction to effect a filtering action and means to operate the pump in reverse direction to effect the discharge of the filter cake, and automatic control means for said pump, permitting the relative durations of the periods of filtering and discharge to be varied in any predetermined manner.

4. In a filtering apparatus of the type described, a tank for liquid, a plurality of filter elements, a filtrate offtake from said filter elements below the normal liquid level in said tank, a rotary pump in said offtake for effecting the flow of liquid through said element, a motor driving said pump and automatic means to vary the direction of rotation of said motor in a predetermined manner, said redirection of rotation forcing a fluid including air through said elements to dislodge any concentration on said elements.

5. In a filtering apparatus of the type described, a tank for the liquid to be filtered, filter elements in said tank, means to force a fluid including air, in reverse direction thru said elements, means above the filter elements for removing the foam from the top of the liquid and means to permit the foam remover to be moved away from the top of the tank to permit access to the filter elements therein.

6. In a filtering apparatus of the type described, a tank for the liquid to be filtered, filter elements in the tank, means to force a fluid including air in reverse direction thru said elements, a frame pivoted at one side of the tank, a foam remover in said frame, and means to move the foam remover and frame about the pivot into and out of position above the filter elements in said tank.

7. In a filtering apparatus of the type described, a tank for the liquid to be filtered, filter elements in said tank, means to force a fluid including air in reverse direction thru said elements, a frame pivoted at one end outside the tank, means in the tank to removably support the other end of the frame, sprocket wheels at each end of the frame, sprocket chains extending between the wheels, flights connecting the sprocket chains, an overflow trough in the wall of the tank, and means to move the flights across the top of the liquid in the tank to sweep the foam into the overflow trough.

8. In a continuous filtering or concentrating apparatus, a filter element comprising a plurality of drainage members, of corrugated shape and having means for removing the filtrate collected in said corrugations, and oversize flexible filter bag thereon, means to force the fluid thru said bag to contract the same in folds, on the drainage member and deposit a cake thereon, and means to force a fluid in reverse direction thru the bag to expand the bag and dislodge the cake thereon, said reversal period being alternated with the depositing period.

9. A filter element comprising a drainage member and a flexible cover of a filter fabric therefor, said cover being greater in size than said drainage member, means for creating a pressure upon the exterior of said cover to cause said cover to cling in folds to the drainage member while said element is submerged in a fluid to be filtered, thereby forming a filter cake thereon, and means to reverse the pressure to expand said cover and straighten out the folds, to dislodge said cake and means to permit an inactive period equal to the reverse period to permit the cake to settle away from the filter element.

10. In a filter of the type described, a filter chamber, a filter element in said chamber, an off-take from said element for the conduction of filtrate therethrough, a source of suction in said off-take, said off-take, between the tank and said source of suction, being disposed at all points at or below the normal liquid level of said tank, whereby the filtrate is not elevated above said normal liquid level during its travel from said tank to said source of suction.

11. In a filter of the type described, a filter chamber, a filter element in said chamber, an off-take from said element for the conduction of filtrate therethru, a source of suction, said off-take being disposed at a side of said tank below the normal liquid level thereof, and extending to said source of suction, said off-take being below said liquid level throughout its length.

12. In an apparatus of the type described, a filter chamber, a filter element therein, a filtrate off-take from said chamber and below the liquid level therein, throughout its length a reversible vacuum pump in said off-take, means to operate said pump forwardly to accomplish filtering, said means including means to operate said pump in the reverse direction to dislodge the cake formed on said filter element.

13. In an apparatus of the type described, a combination suction and gravity filter, comprising a filter tank, a filter element in said tank, a filtrate outlet from said filter element below the normal liquid level of said tank throughout its length and a wet vacuum pump connected to said filtrate outlet, a stand pipe discharging from said pump and means to reverse the pump to force the filtrate in said stand pipe back through the filter element for cleaning the same.

14. In an apparatus of the type described, a filter tank, a plurality of filter elements in said tank, a filtrate outlet from said elements below the normal liquid level in said tank, and a wet vacuum pump connected with said outlet below the normal liquid level in said tank and operating to draw the liquid filtrate through said filter elements and filtrate outlet.

15. In a thickener of the type described, a filter tank, a plurality of filter elements in said tank, a filtrate outlet from said elements, and a wet vacuum pump connected with said outlet and operating to draw the liquid filtrate through said filter elements and a filtrate outlet, said filtrate outlet and the pump being below the normal liquid level of said tank at all points, and means to automatically reverse said pump to force a fluid to flow back through said filter elements to dislodge the cake thereon.

16. In a thickener of the type described, a filter tank, a plurality of filter elements in said tank, a filtrate outlet from said elements below the normal liquid level in said tank, and a wet vacuum pump connected with said outlet and operating to draw the liquid filtrate through said filter elements and a filtrate outlet, means to automatically reverse said pump to force a fluid to flow back through said filter elements to dislodge the cake thereon and means to discharge the thickened cake from said tank.

17. In a thickener of the type described, a tank, a plurality of headers in said tank, a plurality of tubular filter elements on each header, a filtrate manifold, means connecting each header with the filtrate manifold below the normal liquid level in said tank, a sight glass and a shut off valve in each of said connecting means and means to disconnect said manifold to permit removal from said tank and a wet vacuum pump connected with the filtrate manifold below the normal liquid level in said tank operating to draw the liquid filtrate through said filter elements to deposit a filter cake thereon and means to reverse said pump to reverse the flow of filtrate and discharge the cake from said filter elements.

18. In a thickener of the type described, a filter chamber, a filter element in said chamber, an off-take from said element for the conduction of filtrate therethru, a source of suction for said off-take, said off-take being disposed at a side of said tank below the normal liquid level thereof, and extending to said source of suction, said off-take being below said liquid level throughout its length and means to reverse the flow of filtrate in said off-take to dislodge the filter cake from said filter element.

In testimony whereof I have affixed my signature to this specification.

ERNEST J. SWEETLAND.